United States Patent
Yen et al.

(10) Patent No.: US 6,944,179 B2
(45) Date of Patent: Sep. 13, 2005

(54) PHY SIGNAL CONTROL DEVICE AND METHOD FOR SELECTIVELY GENERATING A SPECIFIC WARNING DATA

(75) Inventors: Shu-Yi Yen, Hsinchu (TW); Chan Shen, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 802 days.

(21) Appl. No.: 09/838,217

(22) Filed: Apr. 20, 2001

(65) Prior Publication Data

US 2002/0064155 A1 May 30, 2002

(30) Foreign Application Priority Data

Nov. 30, 2000 (TW) ........................................ 89125451 A

(51) Int. Cl.$^7$ .............................................. H04L 12/66
(52) U.S. Cl. ...................................... 370/463; 370/469
(58) Field of Search ................................ 370/389, 392, 370/463, 902, 903, 390, 432, 465, 469

(56) References Cited

U.S. PATENT DOCUMENTS

| | | | | |
|---|---|---|---|---|
| 5,404,544 A | * | 4/1995 | Crayford | 713/310 |
| 6,169,729 B1 | * | 1/2001 | Feuerstraeter | 370/296 |
| 6,289,000 B1 | * | 9/2001 | Yonge, III | 370/203 |
| 6,535,489 B1 | * | 3/2003 | Merchant et al. | 370/244 |
| 6,556,574 B1 | * | 4/2003 | Pearce et al. | 370/401 |

* cited by examiner

Primary Examiner—Chau Nguyen
Assistant Examiner—Joshua Kading
(74) Attorney, Agent, or Firm—Nixon Peabody LLP; Donald R. Studebacker

(57) ABSTRACT

In the present invention, a PHY signal control device and a method are provided in LAN to selectively generate a specific warning data to a MAC device. When the external transmission configuration changes, the PHY signal control device and the MAC device operate under the same transmission configuration, thus avoiding possible error during transmission. The PHY signal control device mainly includes a first device and a second device, and the first device connects the PHY apparatus and the MAC device, and enables data transmission between them. The second device controls the first device to selectively transfer the general data from LAN or the warning data generated by the first device to the MAC device. Thus, when the external transmission configuration changes, the PHY apparatus soon becomes alert and adjusts to the current transmission configuration. Then the PHY apparatus sends a specific warning data to the MAC device through the second device. The transmission configuration of the MAC device is changed in response to the warning data, so the PHY apparatus and the MAC device work under the same transmission configuration as the external one to avoid transmission error. The PHY apparatus further includes a third device, a fourth device and a fifth device. The third device stores the specific warning data, the fourth device records the current transmission configuration on LAN, and the fifth device handles the general data from LAN and relays the data to the MAC device through the first device and the second device.

8 Claims, 4 Drawing Sheets

PHY SIGNAL CONTROL DEVICE AND METHOD FOR SELECTIVELY GENERATING A SPECIFIC WARNING DATA

FIELD OF INVENTION

The present invention relates to signal control interface in Local Area Network (LAN), and more particularly, to a PHY signal control device capable of selectively generating a warning data and sending it to a medium access control (MAC) device.

BACKGROUND OF INVENTION

In 1984, International Standards Organization (ISO) proposed an Open Systems Interconnection Reference Model (OSI-Model) to define the communication standard between different computers, which enables computers to communicate with each other under a common protocol. The OSI-Model is a structured multilayer communication architecture. It uses 7 vertically-connected layers to define the functions. From the bottom up, they are physical layer (PHY), data-link layer (or MAC), network layer, transport layer, session layer, presentation layer and application layer. An interface exists between two adjacent layers to provide link and communication.

The physical layer is responsible for passing bits onto the physical medium (e.g. twisted pair, coaxial cable) connected to other receivers. On top of the physical layer is data-link layer, which is used for segmenting data into several data frames in order to apply flow control. Data-link layer attaches an error detection and recovery header to every data, and then passes the data onto physical layer for transmission. There exists an interface, which includes a medium access control device (MAC device) and a physical layer signal control device (PHY apparatus) between the physical layer and data-link layer.

The Institute of Electronic and Electrical Engineers (IEEE) has worked out the 802.3u standards, which defines the communication protocols between the PHY apparatus and the MAC device. When data are transmitted between the MAC and the PHY apparatus, the data must conform with a specific data frame format. Refer to FIG. 1 which depicts the structure of the data frame format 10 under the IEEE 820.3u definition. The data frame format 10 contains 3 segments: (1) MAC header 11, (2) MAC data 12, and (3) error checking field 13.

The MAC header 11 further includes a destination address 111, a source address 112 and a sequential number field 113. The destination address 111 contains 6 bytes, and the destination address 111 is used as a broadcast address if all 6 bytes are represented by FF in hexadecimal. If destination address 111 is a multicast address, the first bit of the 6 bytes is designated as 1, otherwise it is set to 0 to show that the destination address 111 is an unicast address, or a physical address dedicated to one LAN adapter. The source address 112 also contains 6 bytes to represent the address of sender, and generally the source address 112 begins with the first bit of 0, but the source address 112 can't be all-zero bytes. In other words, when data are transmitted between the PHY apparatus and the MAC device, the data frame format 10 can't have all-zero bytes in the source address 112.

IEEE 802.3u further defines a communication protocol for PHY apparatus of different Network Interface Cards (NICs) to let PHY apparatus at any ends to communicate with each other under the same data transfer rate or under same duplex mode. Data transfer rate can be either 100 Mbps or 10 Mbps, whereas duplex mode can be full-duplex or half-duplex. So there are 4 possible combinations of the transmission configuration between different NICs. PHY apparatus need to monitor and update the transmission configuration when a change detected in order to maintain consistent transmission configuration.

But a problem arises, as the IEEE 802.3u standard does not define how to inform the MAC device of the update transmission configuration of the PHY apparatus when the PHY apparatus does so. As the IEEE 802.3u standards does not define the scenario, it often happens that the MAC device does not simultaneously update its transmission configuration in accordance with the PHY apparatus. This results in communication error or lost of communication link. For instance, the PHY apparatus and the MAC device are operating at 100 Mbps and fill-duplex mode at the beginning, and then the external transmission configuration changes to 10 Mbps and half-duplex mode. Since the PHY apparatus can automatically sense the change, it soon adjusts to the new configuration without noticing the MAC device. So the MAC device won't be able to switch to the new configuration. Then the PHY apparatus and the MAC device are working under different transmission configuration, and an error easily occurs.

To solve the problem, some conventional MAC devices regularly monitor the PHY apparatus to see if there's an updated transmission configuration and adjust themselves accordingly. But there's a drawback by this mechanism. For instance, if the external transmission configuration stays the same for a long time, the MAC device still has to monitor the PHY apparatus every now and then, which results in a performance downgrade. The preferable solution is to let the PHY apparatus inform the MAC device when it detects a change. In this way, the hardware configuration of MAC device need not be changed and the communication efficiency won't be sacrificed.

SUMMARY OF INVENTION

Based on the reasons mentioned above, the present invention provides a PHY apparatus which detects changes of the external transmission, updates itself and, meanwhile, notifies the MAC device to update the transmission configuration. When MAC device receives the specific warning data, it checks the current transmission configuration of the PHY apparatus and updates its configuration accordingly. Thus the PHY apparatus and the MAC device operates under the same transmission configuration without transmission error. Furthermore, the PHY apparatus alerts the MAC device only if the external transmission configuration has changed. In this way, the performance downgrade issue of the conventional technique will be solved. In the present invention, the PHY apparatus mainly includes a first device and a second device. The first device is used to connect the PHY apparatus and the MAC device, and to enable data transmission between the PHY apparatus and the MAC device. The second device is used to control the first device to selectively transfer the general data from LAN or the warning data generated by the PHY apparatus to the MAC device. Thus, when the external transmission configuration switches, the PHY apparatus soon becomes alert and adjusts to the current transmission configuration. Afterwards, it sends a specific warning data to the MAC device by means of the second device. In response, the MAC device changes its transmission configuration. So the PHY apparatus and the MAC device work with each other under the same transmission configuration as the external device. Consequently, the MAC device doesn't have to monitor the PHY apparatus all the time, and a performance downgrade is avoided. The PHY apparatus further includes a third device, a fourth device and a fifth device. The third device is used to store the specific warning data, the fourth device records the current transmission configuration over the LAN, and the fifth device handles general data from LAN and relays the data to the MAC device through the first device and the second device.

BRIEF DESCRIPTION OF DRAWINGS

To further describe the method, architecture and the characteristics of the present invention, the descriptions of preferable embodiment is recited below together with the following drawings, whereas.

DETAILED DESCRIPTION OF PREFERRED EMBODIMENT

Figure 2:
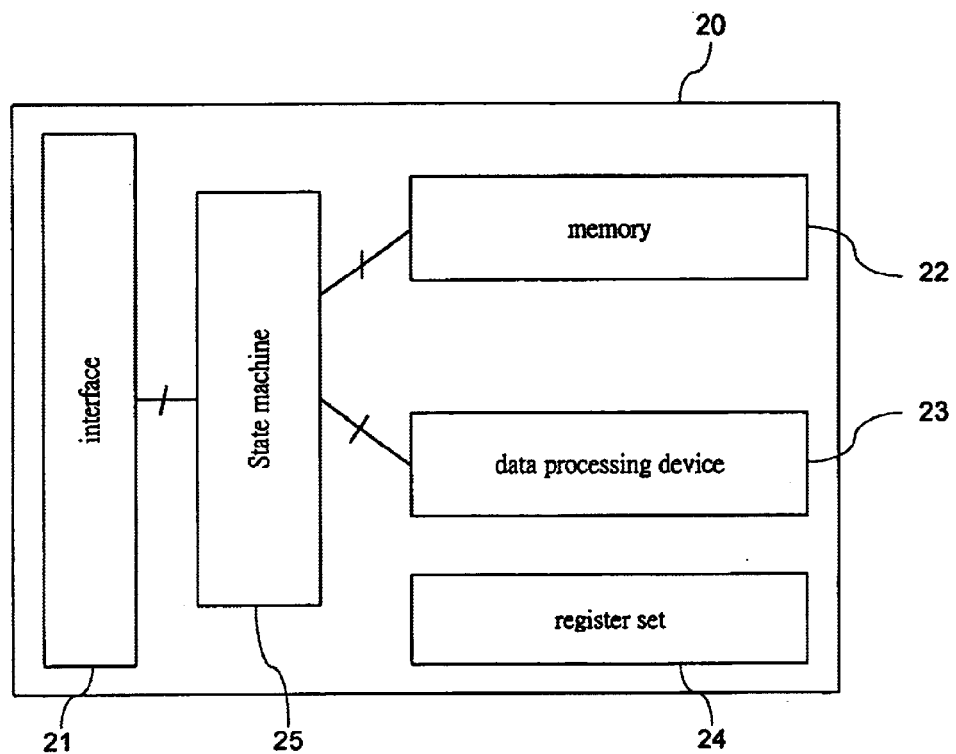
FIG. 2 schematically illustrates the functional structure of the PHY apparatus of the present invention.

Please refer to FIG. 2, which illustrates the structure of the PHY apparatus 20 of the invention. The PHY apparatus 20 includes an interface 21 which connects the PHY apparatus 20 and the MAC device 30 for enabling data transmission between the PHY apparatus 20 and the MAC device 30, shown in FIG. 3. Furthermore, the PHY apparatus 20 includes a state machine 25, a memory 22, a data processing device 23 and a register set 24. The memory 22 stores a specific warning data which warns the MAC device 30 about a change, if any, of the transmission configuration of the PHY apparatus 20. The data processing device 23 handles and relays general data from LAN to the MAC device. The register set 24 records the current transmission configuration, such as 100 Mbps or 10 Mbps, fill-duplex or half duplex. The state machine 25 selectively transmits general data from data processing device 23 or the specific warning data frame of memory 22 to the interface 21.

Figure 3:
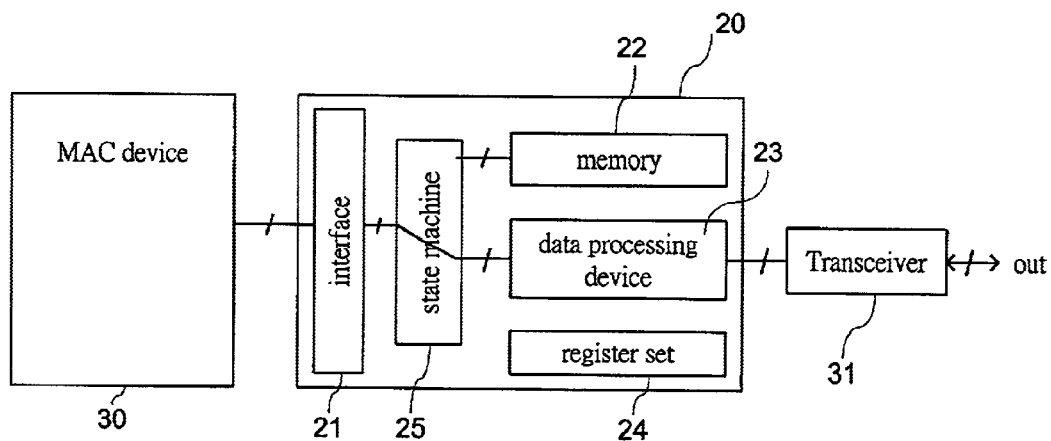
FIG. 3 schematically illustrates how the PHY apparatus connects to the MAC device under the normal mode.

FIG. 3 schematically illustrates the circuit of the PHY apparatus 20 connecting to the MAC device 30 under the normal mode. Under the normal operation mode, the MAC device 30 and the PHY apparatus 20 both have the same transmission configuration. Meanwhile, the general data from LAN (not shown) is transmitted to the data processing device 23 through a transceiver 31, which is connected to the LAN. The state machine 25 enables the connection between the data processing device 23 and the interface 21. Therefore, the general data from the data processing device 23 are relayed to the interface 21, and the interface 21 sends the general data to the MAC device 30 for further processes.

When there's a change occurred in the external transmission configuration (such as transmission configuration alters at the other ends of network or network link is disconnected), the PHY apparatus 20 detects the change and updates itself in accordance with the external transmission configuration. However, in order to adjust the MAC device 30 to the same transmission configuration of the PHY apparatus 20, the present invention uses the following two features of IEEE 802.3u.

Figure 1:
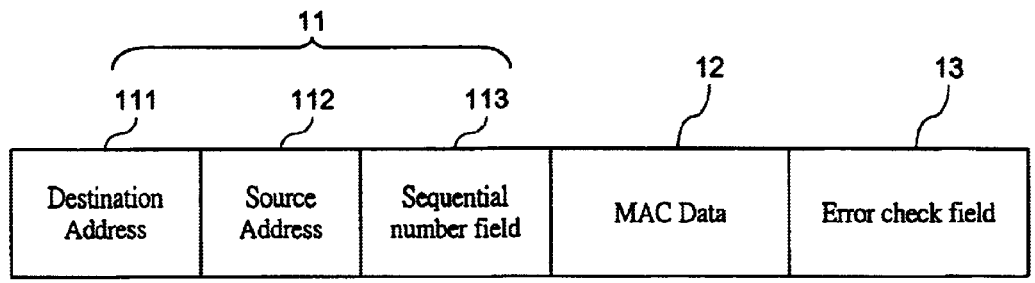
FIG. 1 schematically illustrates the data structure used for data transmission between the MAC and the PHY apparatus defined by IEEE 802.3u.
Figure 4:
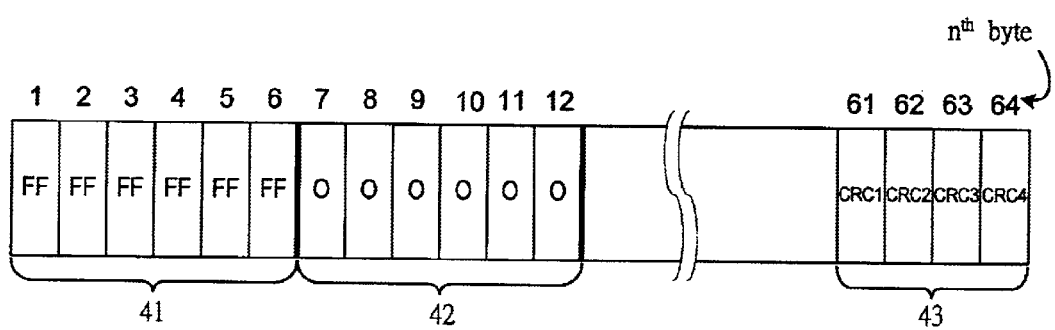
FIG. 4 schematically illustrates the data structure of the specific warning data stored in the memory device of the PHY apparatus.

According to the IEEE 802.3u standard, general data transferred between the MAC device 30 and the PHY apparatus 20 must conform to a data frame format 10, shown in FIG. 1. As mentioned above, the 6 bytes of the source address 112 of the data frame format can't be all-zero. In other words, when the 6 bytes are all set to 0, then the data frame is regarded as non-general data by a driver 51 connected to the MAC device 30. The PHY apparatus 20 of present invention utilize this feature to provide a specific warning data to the MAC device 30. FIG. 4 illustrates the structure of the specific warning data frame 40 which includes a destination address 41, a source address 42 and a cyclic redundancy code 43.

The destination address 41 has 6 bytes being set to FFH, i.e. a broadcasting address aforementioned. In general, the MAC device 30 is designed to receive broadcasting address, so the specific warning data frame is able to reach the MAC device 30. The source address 42 includes 6 bytes being set to 0 to inform the driver 51 that the PHY apparatus 20 has changed its transmission configuration. The 4-byte cyclic redundancy code 43, for error checking purpose, starts at the $61^{st}$ byte and ends at the $64^{th}$ byte of the specific warning data frame 40.

Figure 5:
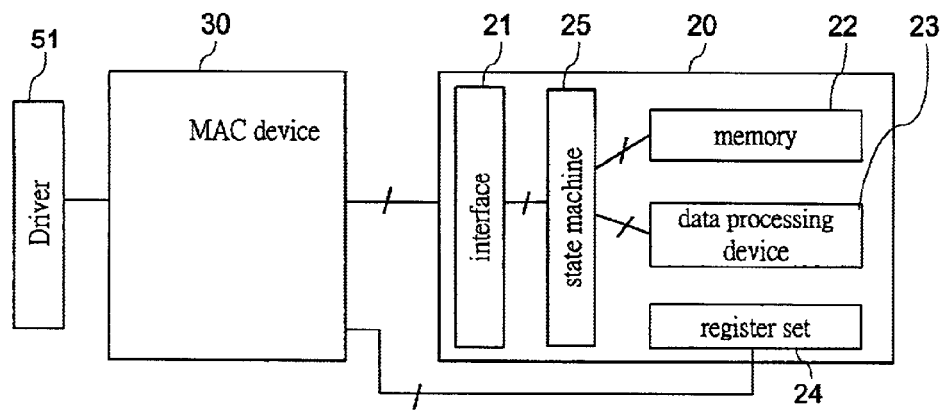
FIG. 5 schematically illustrates how the register set of the PHY apparatus is connected to the driver in the MAC device.

IEEE 802.3u also defines the register set 24 of the PHY apparatus 20. As shown in FIG. 5, the register set 24 records the current transmission configuration of the PHY apparatus 20, and the current transmission configuration can be read by the driver 51 connected to the MAC device 30. The driver 51 controls the operation of MAC device 30 according to the received transmission configuration. When the MAC device 30 receives the specific warning data frame 40 from the memory 22, through the state machine 25 and interface 21, and passes it to the driver 51, the driver 51 detects that all bytes of the source address 42 of the specific warning data frame 40 are 0 which indicates the transmission configuration of the PHY apparatus 20 has been changed. The driver 51 then reads the register set 24 of the PHY apparatus 20 and adjusts the transmission configuration of the MAC device 30 to be the same as the PHY apparatus 20.

Figure 6:
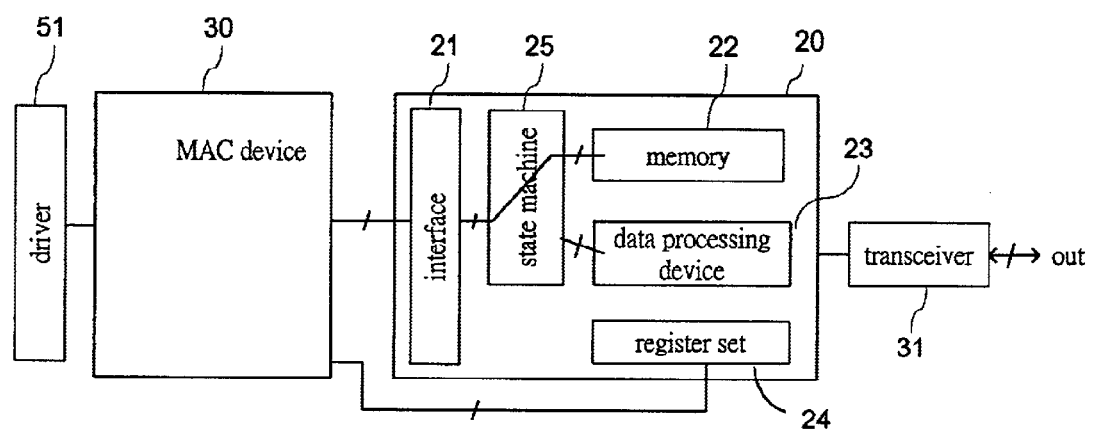
FIG. 6 schematically illustrates how PHY apparatus connects to the MAC device under the alert mode.

FIG. 6 illustrates how the PHY apparatus connects to the MAC device under the alert mode. When the external transmission configuration is not identical to the transmission configuration stored in the register set 24 of the PHY apparatus 20, the PHY apparatus 20 switches to the alert mode and carries out the following steps. The first step involves updating the transmission configuration in the register set 24 to the current external transmission configuration. The second step involves the state machine 25 connecting the interface 21 to the memory 22 which stores the specific warning data 40. Therefore, the MAC device 30 is able to receive the specific warning data 40 from the memory 22, and the driver 51 checks it afterwards.

When the driver 51 checks the specific warning data 40 received, it performs the operations of following steps. The first step involves the driver 51 retrieving the data stored in the register set 24 of the PHY apparatus 20. And afterwards, according to the retrieved data, the driver 51 updates the transmission configuration of the MAC device 30. Therefore, the PHY apparatus 20 and the MAC device 30 have the same transmission configuration.

Figure 7:
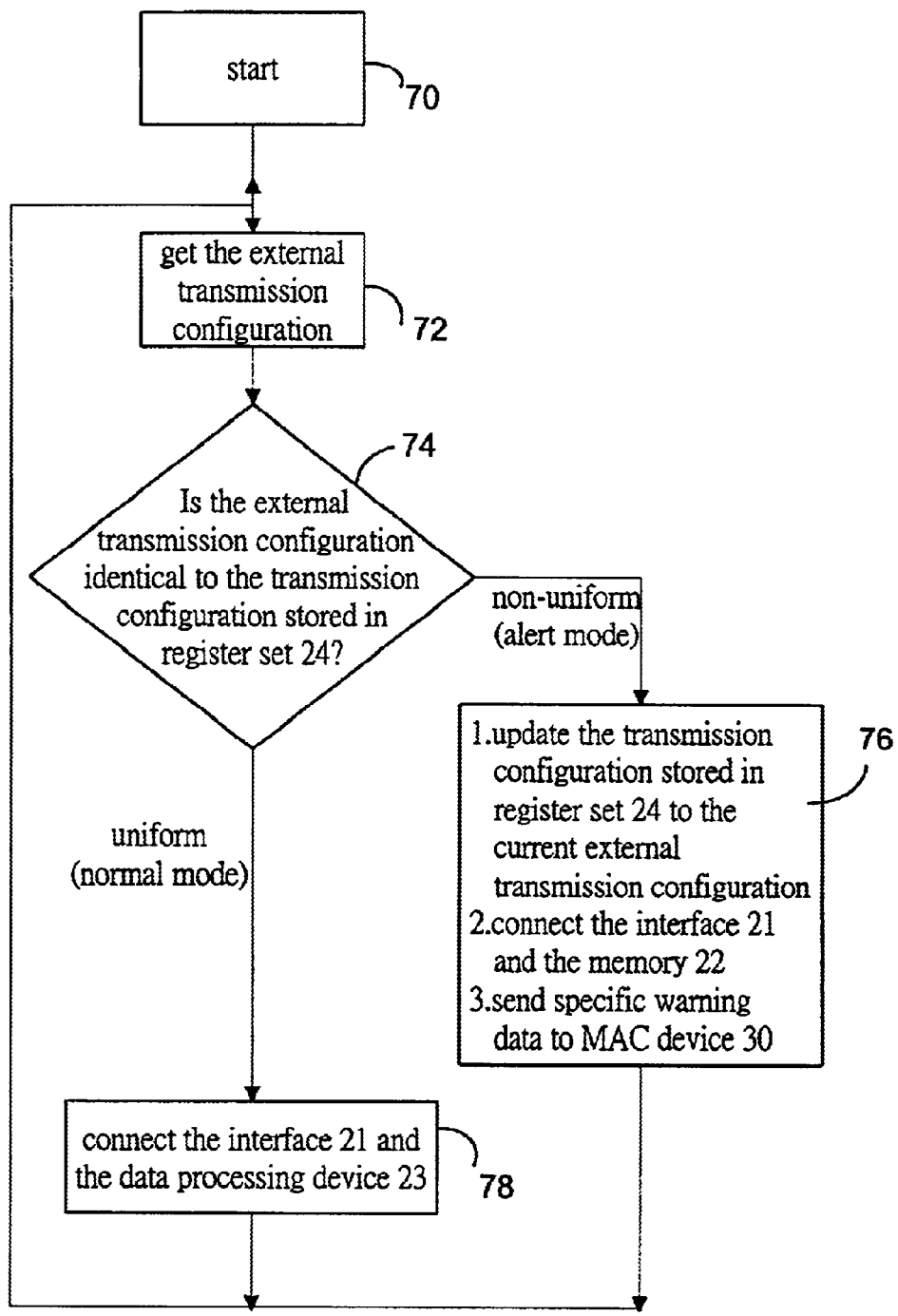
FIG. 7 schematically illustrates the flowchart of the state machine.

To further describe the operation of the PHY apparatus 20 in details, please refer to FIG. 7. FIG. 7 illustrates the flowchart of the state machine 25 of the PHY apparatus 20. The state machine 25 constantly checks the external transmission configuration in the loops formed by blocks 72, 74 and 78, 76. If the external transmission configuration is not identical to the transmission configuration stored in the register set 24, the state machine 25 connects the interface 21 to the memory 22 which stores the specific warning data 40, i.e. in alert mode. So the MAC device 30 is able to receive the specific warning data 40. On the contrary, as the state machine 25 doesn't detect any change of transmission configuration during the loop, the state machine 25 connects the interface 21 to the data processing device 23, i.e. in normal mode, and the general data are transmitted to the MAC device 30.

The followings describes four different operation conditions.

(1) The Network Link is Suddenly Disconnected from Connected Status.

The state machine 25 of the PHY apparatus 20 detects the change and updates the transmission configuration stored in register set 24 to the current external transmission configuration, i.e. network disconnected. Then the state machine 25 connects the interface 21 to the memory 22 to initiate the alert mode. The MAC device 30 receives the specific warning data 40 and pass it to the driver 51. Upon receiving the specific warning data 40, the driver 51 retrieves the updated transmission configuration stored in the register set 24 and perceives the network link is disconnected.

(2) During the Period in which the Network Stays Disconnected.

The state machine 25 constantly detects the external transmission configuration. As the state machine 25 finds out the transmission configuration of the register set 24 is identical to the external transmission configuration, i.e. network disconnected, the state machine 25 enables the connection of the interface 21 and the data processing device 23 to initiate the normal mode.

(3) As the Network Link Returns to Connected Condition from Disconnected Condition.

The state machine 25 of the PHY apparatus 20 detects the change and updates the transmission configuration stored in register set 24 to the current external transmission configuration, i.e. network connected. Then the state machine 25 connects the interface 21 to the memory 22 to initiate alert mode. The MAC device 30 receives the specific warning data 40 and pass it to the driver 51. Upon receiving the specific warning data 40, the driver 51 retrieves the updated transmission configuration stored in the register set 24. Furthermore, the driver 51 controls the MAC device 30 to co-operate with the PHY apparatus 20 under the same transmission configuration.

(4) During the Period in which Network Stays Connected.

The state machine 25 detects the transmission configuration of the register set 24 to be identical to the external transmission configuration, i.e. network connected. The state machine 25 switches to the normal mode under which the interface 21 and the data processing device 23 is connected. The general data are transmitted to the MAC device 30 for further processing.

What is claimed is:

1. An apparatus for Physical Layer (PHY) signal control in a local area network (LAN), comprising:
   a first means for connecting said PHY signal control apparatus and a Media Access Layer (MAC) means, to enable data transmission between said apparatus and said MAC means; and
   a second means for controlling said first means to selectively transfer a general data on said LAN or a specific warning data to said MAC means;
   wherein said specific warning data, generated by said apparatus, comprises a source address with all-zero bytes.

2. The apparatus of claim 1 further comprising:
   a third means, capable of storing said warning data;
   a fourth means, capable of recording a current transmission configuration of said LAN; and
   a fifth means capable of handling general data on said LAN and relaying said general data to said MAC means by means of said first means and said second means.

3. The apparatus of claim 2, wherein said first means includes an interface.

4. The apparatus of claim 2, wherein said second means includes a state machine.

5. The apparatus of claim 2, wherein said third means is a memory device capable of storing the specific warning data, and said source address comprises 6 all-zero bytes, said specific warning data further comprising:
   a destination address, said destination address being a broadcasting address; and
   an error checking data, said error checking data including 4 bytes of cyclic redundancy code (CRC).

6. The apparatus of claim 2, wherein said fourth means includes a register set.

7. A method for a PHY signal control apparatus to provide a specific warning data to a MAC means in a LAN, said method comprising the steps of:
   (a) checking a current external transmission configuration;
   (b) if said external transmission configuration is identical to the transmission configuration stored previously in said PHY signal control apparatus, then said PHY signal control apparatus transferring general communication data to said MAC means; and
   (c) if said external transmission configuration is different to the transmission configuration stored previously in said PHY signal control apparatus, then said PHY signal control apparatus transferring said specific warning data to said MAC means;
   wherein said specific warning data comprises a source address with all-zero bytes.

8. The method of claim 7, wherein the step (c) further comprising:
   (c1) before transferring said warning data to said MAC means, updating the former transmission configuration stored in a set of registers of said PHY signal control apparatus to the current external transmission configuration; and
   (c2) after transferring said specific warning data to said MAC means, a driver of said MAC means retrieves the transmission configuration stored in said set of registers of said PHY signal control apparatus, and sets said MAC means to the current transmission configuration, then said MAC means will operate normally according to the transmission configuration of said PHY signal control apparatus.

* * * * *